US009580101B2

(12) United States Patent
Kawamura

(10) Patent No.: US 9,580,101 B2
(45) Date of Patent: Feb. 28, 2017

(54) ELECTRIC POWER STEERING SYSTEM

(71) Applicant: JTEKT CORPORATION, Osaka-shi, Osaka (JP)

(72) Inventor: Naofumi Kawamura, Kishiwada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/755,391

(22) Filed: Jun. 30, 2015

(65) Prior Publication Data

US 2016/0009313 A1    Jan. 14, 2016

(30) Foreign Application Priority Data

Jul. 9, 2014    (JP) ................. 2014-141652

(51) Int. Cl.
    *B62D 5/04*        (2006.01)
    *F16D 1/072*      (2006.01)
    *F16D 1/08*        (2006.01)

(52) U.S. Cl.
    CPC ........... *B62D 5/0409* (2013.01); *F16D 1/072* (2013.01); *F16D 1/0858* (2013.01)

(58) Field of Classification Search
    CPC ......... B62D 5/0409; F16D 1/072; F16D 7/00; F16D 7/02
    USPC ............................ 180/444; 403/282; 464/182
    See application file for complete search history.

(56) References Cited

U.S. PATENT DOCUMENTS

| 6,364,049 | B1 * | 4/2002 | Iwasaki | B62D 5/0409 180/444 |
| 6,470,993 | B1 * | 10/2002 | Matsuda | B62D 3/126 180/444 |
| 6,805,017 | B2 * | 10/2004 | Chikaraishi | B62D 5/0409 180/443 |
| 6,988,582 | B2 * | 1/2006 | Kitami | B62D 5/0409 180/444 |
| 7,930,950 | B2 * | 4/2011 | Saito | B62D 1/16 74/388 PS |
| 8,556,737 | B2 * | 10/2013 | Yamauchi | B60B 27/00 464/178 |

(Continued)

FOREIGN PATENT DOCUMENTS

| EP | 1207095 A2 | 5/2002 |
| EP | 1327569 A2 | 7/2003 |

(Continued)

OTHER PUBLICATIONS

Jan. 11, 2016 Office Action issued in European Patent Application No. 15175227.6.

*Primary Examiner* — Kevin Hurley
*Assistant Examiner* — Michael Stabley
(74) *Attorney, Agent, or Firm* — Oliff PLC

(57) ABSTRACT

An electric power steering system includes an electric motor and a worm speed reducer. The worm speed reducer includes a worm shaft, a worm wheel, and a ring member. The worm wheel includes an annular tooth portion and an annular support formed of a material that is softer than a material of a shaft. The ring member includes an outer periphery press-fitted with the annular support so as to form plastically deformed portions in part of the annular support, and an inner periphery with which the shaft is press-fitted. The ring member is formed of a material with a hardness equivalent to a hardness of the material of the shaft.

6 Claims, 3 Drawing Sheets

(56) References Cited

U.S. PATENT DOCUMENTS

| | | |
|---|---|---|
| 2001/0009078 A1 | 7/2001 | Ohta et al. |
| 2002/0056588 A1 | 5/2002 | Kuze et al. |
| 2002/0112555 A1 | 8/2002 | Chikaraishi et al. |
| 2004/0083610 A1 | 5/2004 | Kuze et al. |
| 2004/0084865 A1 | 5/2004 | Kitami et al. |
| 2008/0178697 A1 | 7/2008 | Imagaki et al. |

FOREIGN PATENT DOCUMENTS

| | | |
|---|---|---|
| EP | 1950122 A1 | 7/2008 |
| JP | 2001-271903 A | 10/2001 |
| JP | 2002-002509 A | 1/2002 |

\* cited by examiner

ELECTRIC POWER STEERING SYSTEM

INCORPORATION BY REFERENCE

The disclosure of Japanese Patent Application No. 2014-141652 filed on Jul. 9, 2014 including the specification, drawings and abstract, is incorporated herein by reference in its entirety.

BACKGROUND OF THE INVENTION

1. Field of the Invention

The present invention relates to an electric power steering system.

2. Description of Related Art

In general, in known electric power steering systems that transmit a motor torque via a worm speed reducer, a gear portion of a resin material integrated with an outer periphery of a cored bar portion of an iron material is used as a worm wheel.

In recent years, the size of the worm wheel has tended to increase with an increase in mechanical output power of the electric power steering system. Consequently, the size and thus the weight of the cored bar portion increase. This may increase an inertia force exerted at the time of steering to degrade a steering feeling.

Thus, an electric power steering system has been developed, which uses aluminum or the like with a lower specific gravity than iron, as the cored bar portion of the worm wheel. In a technique described in Japanese Patent Application Publication No. 2002-2509 (JP 2002-2509 A), an elastic force applying member for a torque limiter is interposed between an iron shaft and an aluminum cored bar.

Japanese Patent Application Publication No. 2001-271903 (JP 2001-271903 A) describes a power transmission system in which the worm wheel includes two components, that is, a gear portion spline-engaged with an auger shaft and a boss portion. Both the boss portion and the gear portion are formed of an iron material. The boss portion is pressed into the gear portion, and both the boss portion and the gear portion rotate relative to each other to provide a torque limiter function when an overtorque load is applied.

If an outer periphery defined by a cylindrical surface of the iron shaft and an inner periphery defined by a cylindrical surface of the cored bar formed of a material softer than iron, for example, aluminum, are entirely press-fitted together along a circumferential direction, the press-fitted surfaces may seize, leading to inappropriate assembly.

This is considered to be because, at the time of press-in, a plastic flow of a surface layer of the soft material member causes a fresh surface to be exposed, resulting in metallic contact between the hard material and the soft material. In particular, when the hard material and the soft material are entirely press-fitted together along the circumferential direction, plastically deformed portions resulting from the plastic flow have nowhere to escape. The plastically deformed portions cut into the press-fitted surface, resulting in a high likelihood of metallic contact and thus seizure.

SUMMARY OF THE INVENTION

An object of the present invention is to provide an electric power steering system that allows inhibition of inappropriate assembly caused by seizure at the time of press-in.

An electric power steering system according to an aspect of the present invention includes a shaft that transmits a steering force, an electric motor for steering assistance, and a worm speed reducer that reduces a speed of rotation output from the electric motor and transmits the rotation to the shaft.

The worm speed reducer includes a worm shaft that is rotationally driven by the electric motor, a worm wheel having an annular tooth portion with an outer periphery on which teeth are annularly arranged and an annular support that supports an inner periphery of the annular tooth portion and that is formed of a material softer than a material of the shaft, and a ring member having an outer periphery press-fitted with an inner periphery of the annular support so as to form a plastically deformed portion in part of the inner periphery of the annular support, and an inner periphery with which an outer periphery of the shaft is press-fitted, the ring member formed of a material with a hardness equivalent to a hardness of the material of the shaft.

In the electric power steering system in the above-described aspect, at the time of assembly, the outer periphery of the ring portion is press-fitted with the inner periphery of the annular support so as to form the plastically deformed portion in part of the inner periphery of the annular support. Thus, possible seizure can be inhibited at the time of press-in, allowing inappropriate assembly to be inhibited. The shaft and the ring member have an equivalent hardness and are thus unlikely to seize when press-fitted together.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will be described below with reference to the attached drawings.

Figure 1:
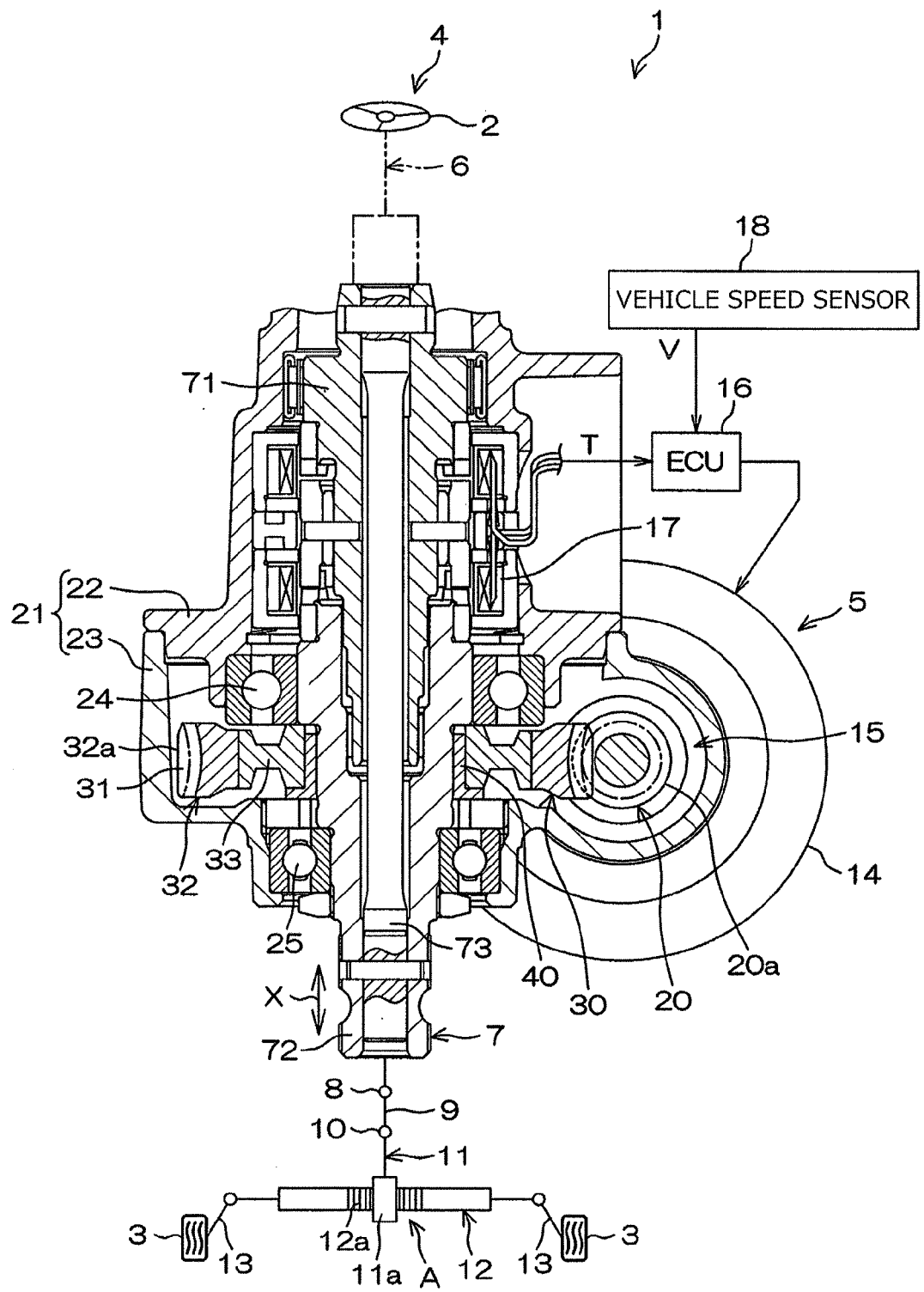
FIG. 1 is a schematic diagram of an electric power steering system in a first embodiment of the present embodiment including a section of the electric power steering system.

FIG. 1 is a schematic diagram depicting a general configuration of an electric power steering system according to a first embodiment of the present invention. As depicted in FIG. 1, an electric power steering system 1 includes a steering mechanism 4 that steers steered wheels 3 based on a driver's operation of a steering wheel 2, and an assist mechanism 5 that assists the driver's steering operation.

The steering mechanism 4 includes a steering shaft 6 that serves as a rotating shaft for a steering wheel 2. The steering shaft 6 includes a column shaft 7 connected to a center of the steering wheel 2, an intermediate shaft 9 coupled to one end (axially lower end) of the column shaft 7 via a universal joint 8, and a pinion shaft 11 coupled to one end (axially lower end) of the intermediate shaft 9 via a universal joint 10.

The column shaft 7 includes an input shaft 71 coupled to the steering wheel 2, an output shaft 72 coupled to the intermediate shaft 9, and a torsion bar 73 that coaxially couples the input shaft 71 and the output shaft 72 together.

A pinion 11a is provided at an axially lower end of the pinion shaft 11. The steering mechanism 4 includes a rack shaft 12 on which a rack 12a meshing with the pinion 11a is formed. The pinion 11a and the rack 12a form a rack-and-pinion mechanism A that is a motion converting mechanism.

When the steering shaft 6 rotates in conjunction with the driver's steering operation, a rotary motion of the steering shaft 6 is converted, via the rack and pinion mechanism A, into a reciprocating linear motion of the rack shaft 12 in an axial direction thereof. The reciprocating linear motion of the rack shaft 12 is transmitted to steered wheels 3 via tie rods 13 coupled to opposite ends of the rack shaft 12. Thus, steered angles of the steered wheels 3 are changed to change the traveling direction of the vehicle.

The assist mechanism 5 includes an electric motor 14 that applies an assist torque to the column shaft 7, a worm speed reducer 15 that transmits rotation of the electric motor 14 to the column shaft 7, and an electronic control unit (ECU) 16 that controls operations of the electric motor 14.

The rotation of the electric motor 14 is transmitted to the column shaft 7 via the worm speed reducer 15 to apply a motor torque to the steering shaft 6, thus assisting the steering operation.

The electric power steering system 1 is provided with a torque sensor 17 that detects a steering torque T that is a torque applied to the steering shaft 6 when the driver performs the steering operation, based on relative rotation of the input shaft 71 and the output shaft 72 of the column shaft 7. The vehicle is provided with a vehicle speed sensor 18 that detects a vehicle speed V (traveling speed of the vehicle).

The ECU 16 sets a target assist force based on the detected steering torque T and the detected vehicle speed V, and feedback-controls a current supplied to the electric motor 14 so as to make the assist torque applied to the column shaft 7 by the electric motor 14 equal to a target assist torque.

The present embodiment will be described with reference to an example where the electric power steering system 1 is of what is called a column assist type in which the electric motor 14 applies an assist force to the column shaft 7. However, the present invention is not limited to this, but is applicable to an electric power steering system of what is called a pinion assist type in which the electric motor applies the assist force to the pinion shaft.

The worm speed reducer 15 includes a worm shaft 20 rotationally driven by the electric motor 14, a worm wheel 30 that meshes with a worm 20a on an outer periphery of the worm shaft 20, and a ring member 40 interposed between the output shaft 72 of the column shaft 7 and the worm wheel 30.

The worm wheel 30 is coupled to the output shaft 72 of the column shaft 7 via the ring member 40. The worm wheel 30 and the column shaft 7 integrally rotate and are precluded from moving in the axial direction relative to each other.

A part of the column shaft 7 is housed in and supported by a housing 21 that provides a part of a steering column. The housing 21 includes a first housing 22 and a second housing 23 that are fitted together.

The first housing 22 functions as a sensor housing in which the torque sensor 17 is housed. The second housing 23 functions as a gear housing in which the worm shaft 20 and the worm wheel 30 are housed.

The output shaft 72 of the column shaft 7 is rotatably supported via a first bearing 24 held by the first housing 22 and a second bearing 25 held by the second housing 23. The first bearing 24 and the second bearing 25 are, for example, ball bearings. The worm wheel 30 is arranged between the first bearing 24 and the second bearing 25 with respect to an axial direction X of the output shaft 72.

Figure 2A:
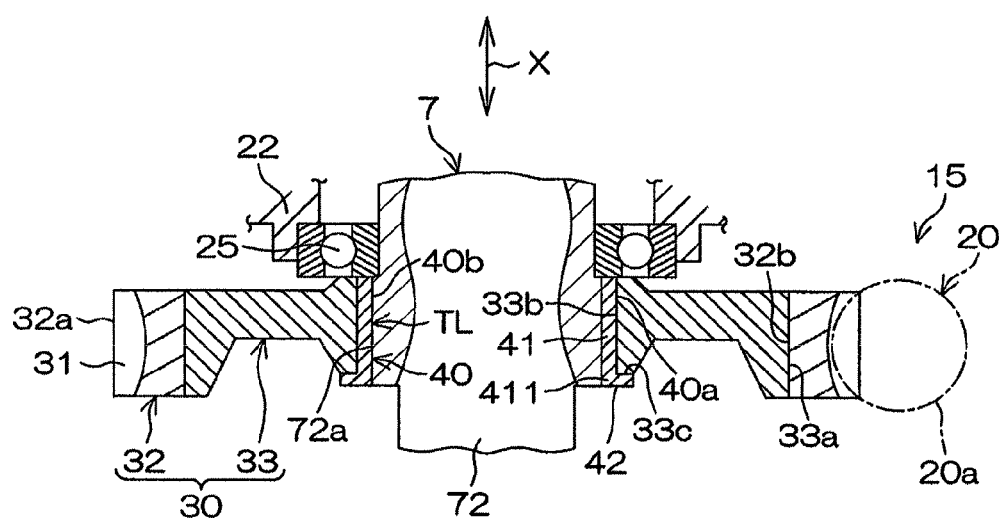
FIG. 2A is an enlarged view of an important part of a worm speed reducer in the electric power steering system.

FIG. 2A is an enlarged sectional view of an important part of the worm speed reducer 15. As depicted in FIG. 1 and FIG. 2A, the worm wheel 30 includes an annular tooth portion 32 formed of resin and having an outer periphery 32a on which teeth 31 are annularly arranged and an annular support 33 formed of metal. The annular support 33 is, for example, inserted into a mold when the annular tooth portion 32 is molded from the resin.

As depicted in FIG. 2A, the annular support 33 includes an outer periphery 33a that supports an inner periphery 32b of the annular tooth portion 32 and an inner periphery 33b with which an outer periphery 72a of the output shaft 72 is press-fitted.

The output shaft 72 of the column shaft 7 is formed of, for example, iron, whereas the annular support 33 is formed of a metal material that is softer than the metal material, e.g., iron or an iron alloy, forming the output shaft 72.

Examples of the metal material forming the annular support 33 include aluminum, an aluminum alloy, magnesium, and a magnesium alloy. The linear thermal expansion coefficient of the metal material forming the annular support 33 is different from the linear thermal expansion coefficient of the metal material forming the output shaft 72. Specifically, the linear thermal expansion coefficient of the metal material forming the annular support 33 is larger than the linear thermal expansion coefficient of the metal material forming the output shaft 72.

The ring member 40 includes a tubular ring member main body 41, and a flange 42 extending radially outward from one end 411 of the ring member main body 41 to engage with an axial end surface 33c of the annular support 33. The flange 42 may be annular or may be formed on a part of the ring member 40 in a circumferential direction.

The ring member 40 includes: an outer periphery 40a (corresponding to the outer periphery of the ring member main body 41) press-fitted with the inner periphery 33b of the annular support 33; and an inner periphery 40b (corresponding to the inner periphery of the ring member main body 41) with which the outer periphery 72a of the output shaft 72 is press-fitted. The ring member 40 is formed of a metal material with a hardness equivalent to the hardness of the output shaft 72, for example, iron or an iron alloy.

The inner periphery 40b of the ring member 40 and the outer periphery 72a of the output shaft 72 provide a torque limiter TL that allows the ring member 40 and the output shaft 72 to slide with respect to each other when a torque exceeding a limit torque is input.

Figure 2B:
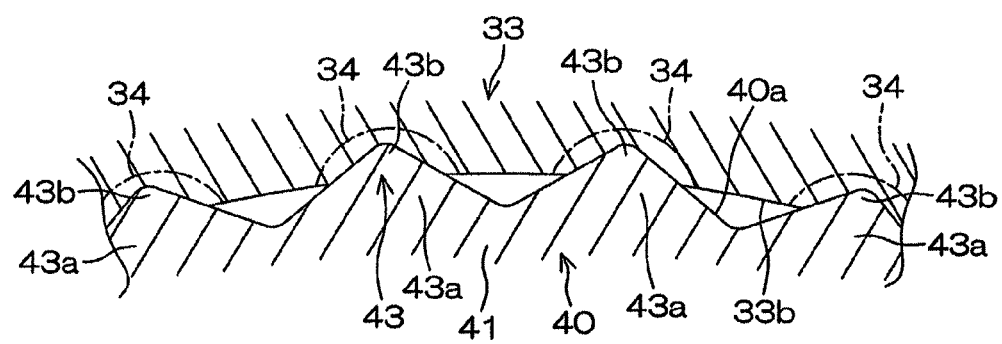
FIG. 2B is a schematic sectional view of a press fitting portion between an annular support of a worm wheel and a ring member.

FIG. 2B is a schematic cross-sectional view of a press fitting portion between the ring member 40 and the annular support 33. As depicted in FIG. 2B, the outer periphery 40a of the ring member 40 is press-fitted with the inner periphery 33b of the annular support 33 so as to form plastically deformed portions 34 in part of the inner periphery 33b of the annular support 33.

Specifically, a serration 43 is provided on the outer periphery 40a of the ring member 40. The serration 43 includes multiple protruding portions 43a separated from one another in the circumferential direction of the outer periphery 40a of the ring member 40. Respective tops 43b of the protruding portions 43a cut into the inner periphery 33b of the annular support 33 to form the plastically deformed portions 34 in the inner periphery 33b of the annular support 33. That is, the plastically deformed portions 34 are formed in part of the inner periphery 33b of the annular support 33 so as to be separated from one another in the circumferential direction of the inner periphery 33b of the annular support 33.

In the present embodiment, the outer periphery 40a of the ring member 40 is press-fitted with the inner periphery 33b of the annular support 33 formed of the material softer than the material of the ring member 40, so as to form the plastically deformed portions 34 in part of the inner periphery 33b of the annular support 33. Therefore, when the worm speed reducer 15 is assembled, possible seizure resulting from the press-in of the ring member 40 against the annular support 33 is inhibited. This allows inhibition of inappropriate assembly of the worm speed reducer 15 and therefore inappropriate assembly of the electric power steering system 1.

That is, if a member of a hard material is press-fitted with a fitting surface of a member of a soft material so as to form a plastically deformed portion over the entire fitting surface along the circumferential direction, a plastic flow of a surface layer of the member of the soft material has nowhere to escape at the time of press-in, leading to the risk of seizure.

In contrast, in the present embodiment, the ring member 40 of the hard material is press-fitted with the inner periphery 33b of the annular support 33 of the soft material so as to form the plastically deformed portions 34 in part of the inner periphery 33b in the circumferential direction. Thus, at the time of press-in, a place where the plastic flow of the surface layer of the inner periphery 33b of the annular support 33 escapes is easily secured, allowing possible seizure to be inhibited.

The ring member 40 is preferably pressed in against the inner periphery 33b of the annular support 33 before the output shaft 72 is pressed in. This is because the inner periphery of the ring member 40 is not restrained and the ring member 40 can thus be easily reduced in diameter at the time of press-in, allowing possible seizure to be further inhibited.

The output shaft 72 and the ring member 40 have an equivalent hardness and are unsusceptible to seizure when press-fitted together.

The fitting surfaces of the output shaft 72 and the ring member 40, which have an equivalent hardness, provide the torque limiter TL. That is, when an overtorque is input, the outer periphery 72a of the output shaft 72 and the inner periphery 40b of the ring member 40 slide with respect to each other, limiting a transmitted torque to the limit torque or lower. Thus, possible damage to the teeth 31 of the worm wheel 30 can be prevented, allowing the steering function to be maintained.

The linear thermal expansion coefficient of the ring member 40 is equivalent to the linear thermal expansion coefficient of the output shaft 72. Therefore, even with a change in temperature, the tightening margin between the ring member 40 and the output shaft 72 is unchanged. This prevents a possible change in sliding torque (corresponding to the limit torque for the torque limiter TL) between the ring member 40 and the output shaft 72 and a possible change in sliding load between the ring member 40 and the output shaft 72 in the axial direction X.

As depicted in FIG. 2B, the ring member 40 formed of the harder material than the annular support 33 is fitted with the inner periphery 33b of the annular support 33 such that the serration 43 on the outer periphery 40a of the ring member 40 forms the plastically deformed portions in part of the inner periphery 33b of the annular support 33. Even when the tightening margin between the outer periphery 40a of the ring member 40 and the inner periphery 33b of the annular support 33 is changed due to a change in temperature, the change in the tightening margin can be absorbed by the serration fitting area. This allows inhibition of sliding of the outer periphery 40a of the ring member 40 and the inner periphery 33b of the annular support 33 with respect to each other in the rotating direction.

The flange 42 provided on the ring member 40 engages with the axial end surface 33c of the annular support 33 to allow prevention of sliding of the ring member 40 and the annular support 33 with respect to each other in the axial direction.

Figure 3:
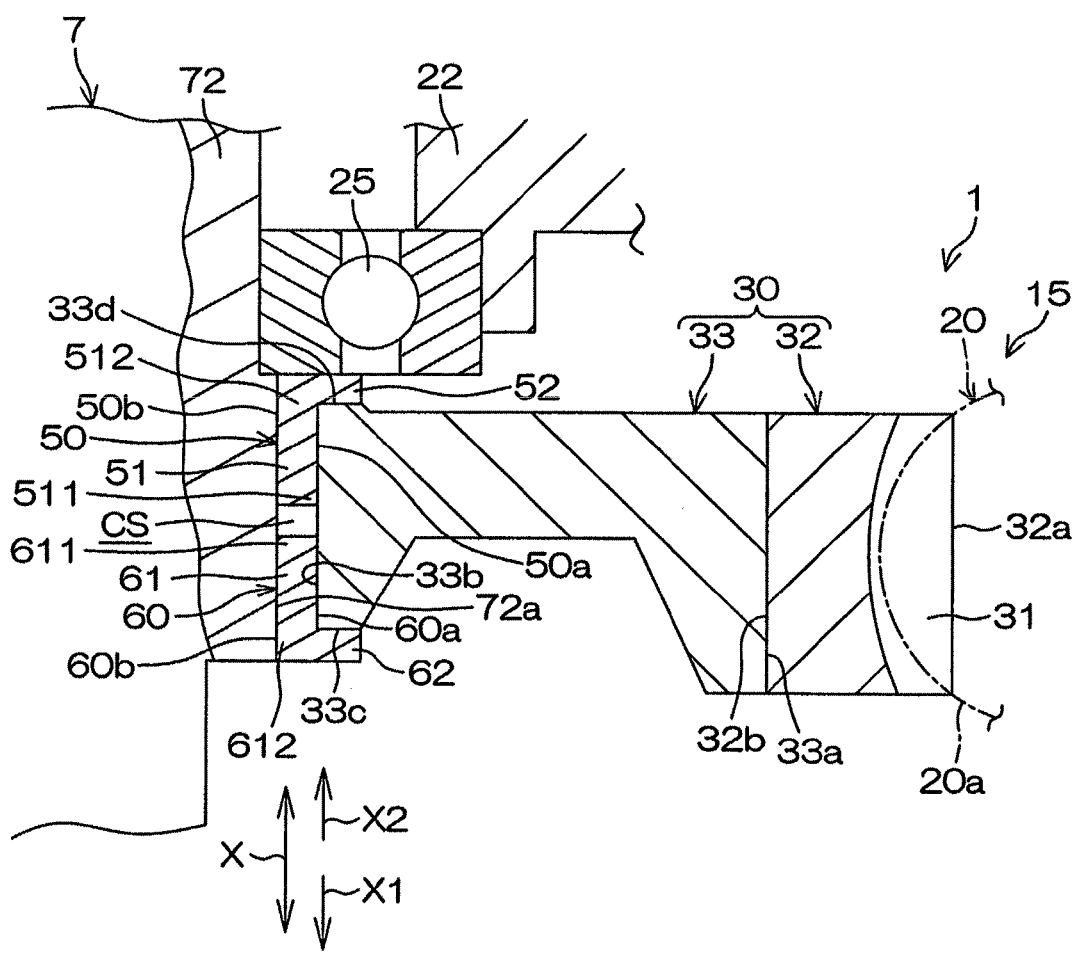
FIG. 3 is an enlarged sectional view of an important part of a worm speed reducer in an electric power steering system in a second embodiment of the present invention.

FIG. 3 depicts a second embodiment of the present invention. The second embodiment in FIG. 3 is different from the first embodiment in FIG. 2A mainly in the following. That is, as the ring member interposed between the outer periphery 72a of the output shaft 72 and the inner periphery 33b of the annular support 33 of the worm wheel 30, a pair of ring members 50 and 60 is provided. The ring members 50 and 60 face each other, as depicted in FIG. 3.

Specifically, the ring members 50 and 60 include ring member main bodies 51 and 61 corresponding to the ring member main body 41 in the first embodiment in FIG. 2A and flanges 52 and 62 corresponding to the flange 42 in the first embodiment in FIG. 2A.

Outer peripheries 50a and 60a (corresponding to the outer peripheries of the ring member main bodies 51 and 61) of the ring members 50 and 60 are press-fitted with the inner periphery 33b of the annular support 33 so as to form plastically deformed portions (corresponding to the same configuration as that in FIG. 2B though this is not depicted in the drawings) in part of the inner periphery 33b. The outer periphery 72a of the output shaft 72 is press-fitted with inner peripheries 50b and 60b (corresponding to the inner peripheries of the ring member main bodies 51 and 61) of the ring members 50 and 60.

The ring member main bodies 51 and 61 of the ring members 50 and 60 have first ends 511 and 611 serving as facing ends that face each other in the axial direction X, and second ends 512 and 612 opposite from the first ends 511 and 611, respectively.

The ring members 50 and 60 are pressed in against the inner periphery 33b of the annular support 33 so as to place the first ends 511 and 611 (facing ends) of the ring members 50 and 60 face each other. That is, the ring member 50 is pressed in in one direction X1 along the axial direction X, and the ring member 60 is pressed in in the other direction X2 along the axial direction X.

A gap space CS is formed between the first ends 511 and 611 (facing ends) of the ring member main bodies 51 and 61 of the ring members 50 and 60. The gap space CS is defined by the outer periphery 72a of the output shaft 72, the inner periphery 33b of the annular support 33, and the first ends 511 and 611 of the ring member main bodies 51 and 61 of the ring members 50 and 60.

The flanges 52 and 62 extend from the second ends 512 and 612 of the ring member main bodies 51 and 61, respectively, and engage with the axial end surfaces 33d and 33c, respectively, of the annular support 33.

The same components of the second embodiment in FIG. 3 as the corresponding components of the first embodiment in FIG. 2A are denoted by the same reference numerals as the corresponding reference numerals of the first embodiment in FIG. 2A.

The second embodiment can produce the same advantageous effects as those of the first embodiment. Moreover, the ring members 50 and 60 are externally press-fitted with the inner periphery 33b of the annular support 33 from the opposite sides in the axial direction X. The flanges 52 and 62 of the ring members 50 and 60 engage with the axial end surfaces 33d and 33c, respectively, of the annular support 33 to allow prevention of sliding of the ring members 50 and 60 and the annular support 33 in the axial direction X.

Furthermore, chips resulting from external press fitting of the ring members 50 and 60 in the output shaft 72 can be housed in the gap space CS between the ring members 50 and 60. If the gap where the chips escape is not present between the ring members 50 and 60, then the chips are collected between the ring members 50 and 60, with a corresponding amount of axial gap formed between the annular support 33 and the flanges 52 and 62 of the ring members 50 and 60. This may lead to a situation where the flanges 52 and 62 of the ring members 50 and 60 fail to prevent axial sliding of the annular support 33. In contrast, in the present invention, the gap space CS where the chips escape is formed between the ring members 50 and 60, allowing the above-described situation to be inhibited.

The present invention is not limited to the above-described embodiments. For example, instead of the serration formed on the outer periphery of the ring member, a plurality of protruding portions (not depicted in the drawings) separated from one another in the circumferential direction may be provided on the outer periphery of the ring member in order to form plastically deformed portions in part of the inner periphery of the annular support. Alternatively, keys (not depicted in the drawings) held in axial grooves in the outer periphery of the ring member may be pressed in against the inner periphery of the ring member to form plastically deformed portions in part of the inner periphery.

The present invention may be applied to an electric power steering system of a type in which a driving force of the electric motor is transmitted to the pinion shaft. In that case, the pinion shaft includes an input shaft coupled to the intermediate shaft side, an output shaft forming a pinion, and a torsion bar coaxially coupling the input shaft and the output shaft together. The ring member is press-fitted with the outer periphery of the output shaft, and the inner periphery of the annular support of the worm wheel is press-fitted with the outer periphery of the ring member.

What is claimed is:

1. An electric power steering system comprising:
   a shaft that transmits a steering force;
   an electric motor for steering assistance; and
   a worm speed reducer that reduces a speed of rotation output from the electric motor and transmits the rotation to the shaft; wherein the worm speed reducer includes:
   a worm shaft that is rotationally driven by the electric motor;
   a worm wheel having an annular tooth portion with an outer periphery on which teeth are annularly arranged and an annular support that supports an inner periphery of the annular tooth portion and that is formed of a material softer than a material of the shaft; and
   a ring member having an outer periphery press-fitted with an inner periphery of the annular support so as to form a plastically deformed portion in part of the inner periphery of the annular support, and an inner periphery with which an outer periphery of the shaft is press-fitted, the ring member formed of a material with a hardness equivalent to a hardness of the material of the shaft,
   wherein the ring member includes a ring member main body and a flange that extends radially outward from the ring member main body to engage with an axial end surface of the annular support.

2. The electric power steering system according to claim 1, wherein the inner periphery of the ring member and the outer periphery of the shaft provide a torque limiter that allows the ring member and the shaft to slide with respect to each other when a torque exceeding a limit torque is input.

3. The electric power steering system according to claim 1, wherein a linear thermal expansion coefficient of the ring member is different from that of the annular support, and a serration is provided on the outer periphery of the ring member.

4. The electric power steering system according to claim 1, wherein
   as the ring member, a pair of ring members is included, the ring members facing each other in an axial direction,
   ring member main bodies of the ring members include respective first ends facing each other in the axial direction and respective second ends each opposite from the corresponding first end, and
   the flange extends radially outward from the second end of each of the ring member main bodies to engage with the corresponding axial end surface of the annular support.

5. The electric power steering system according to claim 4, wherein a gap space is formed between the first ends of the ring members.

6. The electric power steering system according to claim 1, wherein a linear thermal expansion coefficient of the ring member is equivalent to that of the shaft.

* * * * *